United States Patent
Maus et al.

(10) Patent No.: US 8,574,791 B2
(45) Date of Patent: Nov. 5, 2013

(54) METHOD FOR PRODUCTION OF A SOLID OXIDE FUEL CELL (SOFC)

(75) Inventors: Harald Maus, Sindelfingen (DE); Uwe Glanz, Asperg (DE); Raphaelle Satet, Tilburg (FR); Gudrun Oehler, Stuttgart (DE); Leonore Schwegler, Stuttgart (DE); Benjamin Hagemann, Gerlingen (DE); Alexander Bluthard, Stuttgart (DE); Erhard Hirth, Ellhofen (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

(21) Appl. No.: 13/009,347

(22) Filed: Jan. 19, 2011

(65) Prior Publication Data

US 2011/0177434 A1 Jul. 21, 2011

(30) Foreign Application Priority Data

Jan. 19, 2010 (DE) .......................... 10 2010 001 005

(51) Int. Cl.
*H01M 8/12* (2006.01)
*B29C 45/14* (2006.01)

(52) U.S. Cl.
USPC .......................... 429/535; 264/262; 264/279

(58) Field of Classification Search
USPC .......................... 429/497, 535; 264/262, 279
See application file for complete search history.

(56) References Cited

U.S. PATENT DOCUMENTS

| 6,913,850 B2 * | 7/2005 | Sehlin et al. .................. 429/497 |
| 6,998,187 B2 * | 2/2006 | Finnerty et al. ........... 429/497 X |
| 2011/0294041 A1 * | 12/2011 | Kuehn et al. .................. 429/512 |

FOREIGN PATENT DOCUMENTS

| DE | 60123840 | 5/2007 |
| EP | 0932214 | 7/1999 |

OTHER PUBLICATIONS

N. Stelzer, R. Zauner, W. Grienauer, L. Baca, u.a.: "Miniaturisierte keramische Hochtemperatur Brennstoffzellen Komponenten", www.fabrikderzukunft.at, Jan. 24, 2007, pp. 1-64, XP002630265.

* cited by examiner

*Primary Examiner* — Stephen J. Kalafut
(74) *Attorney, Agent, or Firm* — Michael Best & Friedrich LLP

(57) ABSTRACT

A method for production of a solid oxide fuel cell (SOFC) (1), having an electrolyte body (10) with a tubular structure, wherein at least one internal electrode (11) and one external electrode (12) are applied to the tubular electrolyte body, with the method having at least the following steps: provision of an injection molding core (13) on which at least one interconnector material (14) and the internal electrode (11) are mounted, arrangement of the injection molding core (13) in an injection mold (25*a*, 25*b*), injection molding of an electrolyte compound (10*a*) in order to form the electrolyte body (10), and removal of the injection molding core (13) in the form of a casting process with a lost core.

18 Claims, 2 Drawing Sheets

METHOD FOR PRODUCTION OF A SOLID OXIDE FUEL CELL (SOFC)

BACKGROUND OF THE INVENTION

The present invention relates to a method for production of a solid oxide fuel cell (SOFC) having an electrolyte body in tubular form, wherein at least one internal electrode and one external electrode are applied to the electrolyte body.

Solid oxide fuel cells (SOFC) with a ceramic electrolyte body form a high-temperature variant of fuel cells. They are operated at 600° C. to 1000° C., and in the process provide very high electrical efficiencies of up to about 50%. In principle, solid oxide fuel cells are subdivided into two main variants: one variant is formed by a tubular shape of the electrolyte body which, according to a further variant, can be bounded, by a flat, planar form. In this case, it is necessary to fit the internal and external electrodes to the wall of the electrolyte body during the method for production of a solid oxide fuel cell based on the tubular variant. For this purpose, it is known for the electrode which is arranged on the inside of the electrolyte body, generally in the form of the anode, around which the fuel gas flows, to be applied as a coating on the inner wall of the electrolyte body. In this case, the electrolyte body is preferably extruded.

In addition to the mounting of the electrodes on the finished electrolyte body, so-called interconnectors are applied flat to the electrodes in order to make contact with them, in which case fitting on the inside of the electrolyte body frequently leads to problems. Metallic interconnectors are known, which are composed of a material with a high chromium content, in order to obtain adequate corrosion resistance, combined with adequate electrical conductivity, on the basis of the high operating temperatures. The chromium-oxide layer which is formed during operation of the fuel cell in this case has a negative effect on the cathode material, and can lead to premature aging of the fuel cell. In contrast, ceramic interconnectors for making electrical contact with the electrodes are known in the planar form, but have not previously been used for tubular solid oxide fuel cells. Because the electrolyte bodies are very thin, there are major problems associated with fitting ceramic interconnectors to the inner wall of the electrolyte body. The problem results in particular from the thin walls since, for example, the electrolyte body preferably has a wall thickness of about 200 μm, in which case the porous anode on the inside of the electrolyte body must be coated with a ceramic interconnector layer. For cost reasons, the electrodes themselves must likewise be made thin, for example with a thickness of 50 μm. Furthermore, the interconnector layer must likewise be highly porous, with further advantages being obtained from the interconnector material on the surface of the electrolyte body having a thickness which varies over the longitudinal extent of the electrolyte body.

SUMMARY OF THE INVENTION

The object of the present invention is therefore to overcome the disadvantages mentioned above relating to the production of a solid oxide fuel cell, and to provide a method for producing an electrolyte body, as well as the electrodes and corresponding interconnector layers which are required on the inside and/or outside of the electrolyte body, in a simple manner.

The invention includes the technical teaching that the method for production of a solid oxide fuel cell comprises at least the steps of provision of an injection molding core on which at least one interconnector material and the internal electrode are mounted, with the method furthermore comprising the arrangement of the injection molding core in an injection mold, the injection molding of an electrolyte compound in order to form the electrolyte body, and the removal of the injection molding core in the form of a casting process with a lost core.

The invention is in this case based on the idea that a ceramic injection molding process is used to produce the electrolyte body, in which the interconnector material and the internal electrode are already arranged in the injection molding step such that they can form a connection to the electrolyte body. In this process, an injection molding core is arranged centrally in an injection mold such that a tubular cavity is formed into which the electrolyte compound is injected in order to form the electrolyte body. Since both the interconnector material and the internal electrode have already been applied to the injection molding core, the electrolyte compound can form a connection to the inner electrode, such that is subsequently necessary to remove the injection molding core from the electrolyte body and from the internal electrode. The interconnector material is applied to the injection molding core before the application of the material to form the internal electrode, such that the electrolyte compound can form a connection to the material of the internal electrode.

The injection molding core can advantageously be removed by means of a thermal process, and preferably by means of a lost core technique when the electrolyte body is being injection molded. The principle of destroying the shaping components for casting of a workpiece during removal from the mold is referred to as a lost core process, which can be used in the present case. The thermal removal of the injection molding core can be carried out during a sintering process, to which the electrolyte body together with the interconnector material and the internal electrode are passed after the injection molding process.

The injection molding core can advantageously be formed from a plastic material, wherein the thermal process for removal of the injection molding core is preferably carried out by burning out the plastic material from the electrolyte body.

The injection molding core may be formed with a conical external contour, such that a first end with a large diameter and a second end with a small diameter of the injection molding core are formed, wherein the second end with the small diameter constitutes the side of the electrolyte body which forms the holding end of the tubular electrolyte body on a base body. If the interconnector material and/or the internal electrode are/is now applied to the injection molding core by means of a printing process, in particular by means of a web-fed printing process or a screen printing process, then the application can be carried out such that a cylindrical overall body is produced after application of the interconnector material and the material of the internal electrode. This results in an area of the interconnector material which has a greater wall thickness, with this area being used to subsequently make electrical contact with the internal electrode, because the highest current density occurs at the contact end of the interconnector material. This allows the thickness of the interconnector material to be matched to the current density over the length of the electrolyte body.

According to a further advantageous embodiment of the method according to the invention, the interconnector material and/or the internal electrode are/is applied to a carrier film, which is arranged on the injection molding core before the injection molding of the electrolyte compound, such that the electrolyte compound is connected to the internal electrode on the carrier film when the electrolyte compound is injection molded.

The interconnector material can advantageously be fitted to the carrier film in layers, with the internal electrode being fitted only after this has been done. If the layers of the interconnector material are fitted with a different width over the length of the injection molding core, then free areas are formed which can be filled with filling layers, in particular with glassy carbon layers. A large number of layers fitted one on top of the other and with a different width create a variable-thickness interconnector, whose thickness increases in the direction for making contact with the interconnector, since the current density is highest here. The electrolyte body can be held on a base body via a flange, via which contact is made with the interconnector. In consequence, more layers of interconnect material are applied to the carrier film in the direction facing the flange when the fuel cell is complete, and in consequence in the direction for making contact. Filling layers, in particular glassy carbon layers, can be applied to the carrier film in order to fill the free areas which result from a reduced number of layers applied. Since layers of interconnector material are initially not applied to the carrier film over the entire length corresponding to the length of the injection molding core, the filling layers are applied adjacent to the individual layers of the interconnector material. In consequence, a next layer of interconnector material can also be applied above a filling layer. Once the layers of interconnector material have all been applied, the material to form the internal electrode is then applied.

According to a further advantageous embodiment, the injection molding core may have grooves into which the interconnector material is introduced, in order to form an interconnector layer which has a structure, preferably a web structure or a grid structure. By way of example, the interconnector material can be introduced into the grooves in the injection mold by a wiper. In consequence, the interconnector forms a matrix structure on the electrode, in order not to cover it completely. The number of grooves can advantageously be increased over the length of the injection molding core in one direction in the structure, in order to form a larger line cross section in the direction in which contact will later be made with the interconnector, in order to carry the greater current density.

The interconnector material may be applied with a small thickness in the area of the first end and with a large thickness in the area of the second end, such that the interconnector material has a conical internal shape, and preferably compensates for the conical shape of the injection molding core, such that the interconnector material has an approximately cylindrical external shape. In this case, the grooves in the injection molding core may also have a different depth, which increases in the direction in which contact will later be made with the interconnector.

According to a further method step, after the electrolyte body together with the internal electrode and the interconnector material have been removed from the mold, the external electrode is fitted, and is preferably subsequently burnt in. The external electrode can also be provided with an interconnector material which can be applied after the electrolyte body has been removed from the injection mold, in which case the external electrode and an interconnector which is provided on the outside can also be applied in the same manner to that on the inside of the electrolyte body, based on the principle of film insert molding. In particular, the principle of film insert molding can be provided both from the direction of the injection molding core and from the direction from the inside of the injection mold for spraying the electrolyte body.

BRIEF DESCRIPTION OF THE DRAWINGS

Further measures which improve the invention will be described in more detail in the following text together with the description of one preferred exemplary embodiment of the invention, with reference to the figures, in which.

DETAILED DESCRIPTION

Figure 1:
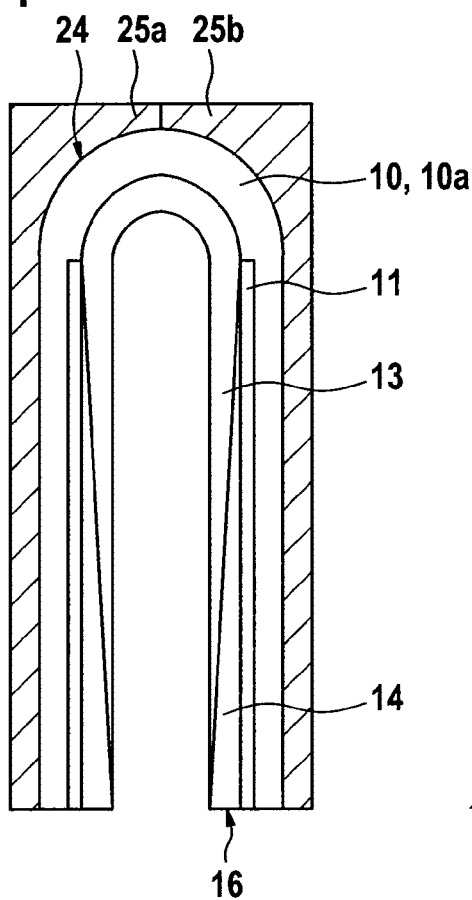
FIG. 1 shows a schematic view of one exemplary embodiment of the present invention.
Figure 5:
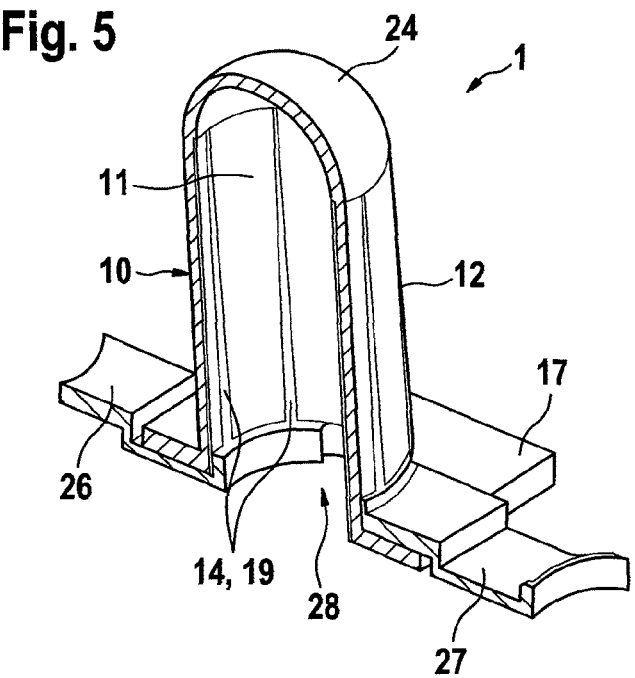
FIG. 5 shows a perspective view of an electrolyte body with an internal electrode and an external electrode, in each case with interconnector material applied.

FIG. 1 shows a schematic view of one exemplary embodiment of the method for production of a solid oxide fuel cell 1, as is illustrated in perspective form in FIG. 5. First of all, FIG. 1 shows a cross section through an injection mold, which has a first mold element 25a and a second mold element 25b. The mold elements 25a and 25b can move with respect to one another, and can be moved apart from one another in order to remove an injection-molded electrolyte body 10 from the mold. The electrolyte body 10 is in the form of an electrolyte body that is closed at the ends, and therefore has a cap 24. According to one possible embodiment for production of the electrolyte body 10, this may be in the form of a single part, such that the tubular, cylindrical section of the electrolyte body 10 can be produced by injection of an electrolyte compound 10a into the injection mold, in which case the cap 24 can also be produced by the electrolyte compound 10a itself in the injection mold. On the inside, the injection mold has an injection molding core 13 which is illustrated merely by way of example as a hollow core, in order to minimize the mass of the injection molding core 13 which has to be removed by burning out once the injection molding process has been completed. On the outside, an interconnector material 14 is first of all applied to the injection molding core 13, with the lower face having a large thickness which decreases in the direction of the cap 24 of the electrolyte body 10. An internal electrode 11 is applied to the interconnector material 14 and forms a direct connection with an electrolyte mass 10 when the latter is injected. When the electrolyte body 10 that has been formed in this way is removed from the injection mold, and the injection molding core 13 has been removed by a thermal process from the inside of the electrolyte body 10, preferably by a thermal process, then an electrolyte body 10 is produced having an internal electrode 11 and an interconnector material 14 which makes contact with it. At the same time, the interconnector material 14 is already thicker at the second end 16 of the electrolyte body 10 than at the first end 15 since the subsequent contact will be made at this end, and a higher current density must therefore be taken into account.

Figure 2:
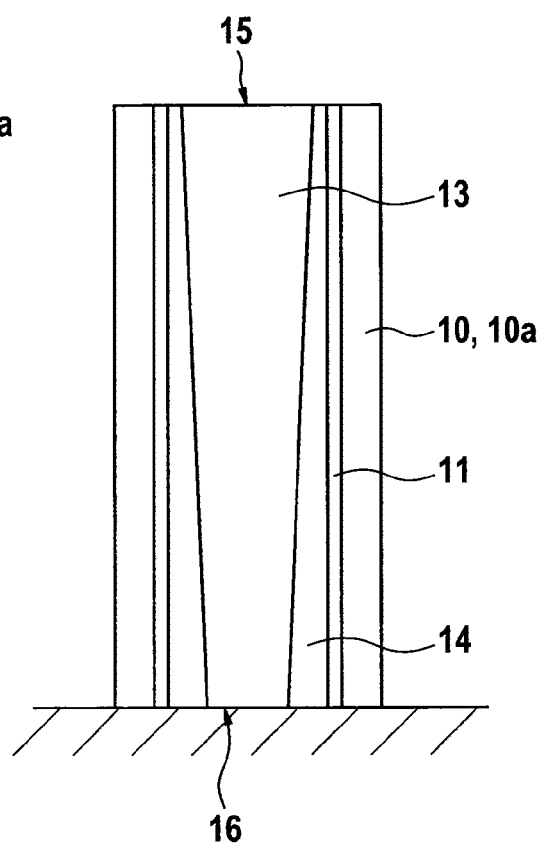
FIG. 2 shows a further view of one exemplary embodiment of the present invention with a conical injection molding core.
Figure 3:
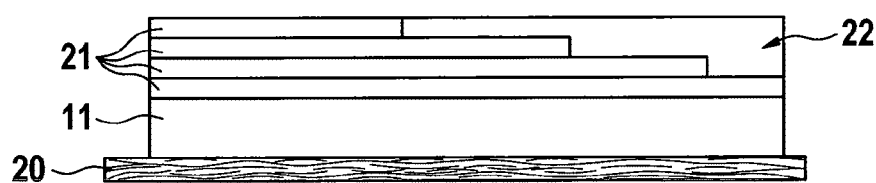
FIG. 3 shows a schematic view of interconnector material being applied in layers on a carrier film.
Figure 3:
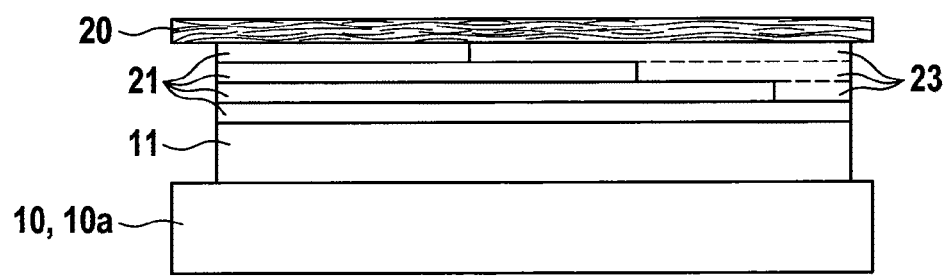

FIG. 2 shows schematic views of the configuration of the coatings on a carrier film 20, with the carrier film 20 being adjacent to the internal electrode 11 in the upper illustration while, in contrast, the carrier film 20 is illustrated in the lower illustration as being adjacent to layers 21 of interconnector material. The principle of film insert molding can therefore be implemented, with the film being applied with the layer structure to the injection molding core 13.

According to the upper illustration, the carrier film 20 is first of all coated with the internal electrode 11, with layers 21 of interconnector material then being applied to the internal electrode 11. The layers 21 of the interconnector material are shown with different extents, thus resulting in a free area 22 which is then filled with a filling layer 23, for example composed of glassy carbon layers 23. The electrolyte compound 10*a* is then sprayed on in order to form the electrolyte body 10, such that the electrolyte compound 10*a* can make a firm, integral connection to the internal electrode 11.

The carrier film 20 may be filled over the area, such that it can be placed around the cylindrical injection molding core 13. It is particularly advantageous for the carrier film 20 to be preformed in the form of a sleeve or flexible tube, such that the sleeve or the flexible tube can be placed, with the layers 11 and 21 or 23 applied to it, over the injection molding core 13.

The carrier film 20 can likewise also be removed by means of a thermal process by removing the injection molding core 13 after the injection molding step. This results in an electrolyte body 10 with an applied internal electrode 11 and an interconnector formed from layers 21. In order to obtain a cylindrical overall shape, the filling layers 23 are provided at the points which the remaining layer thicknesses of the layers 21 fill before the interconnector material.

Figure 4:
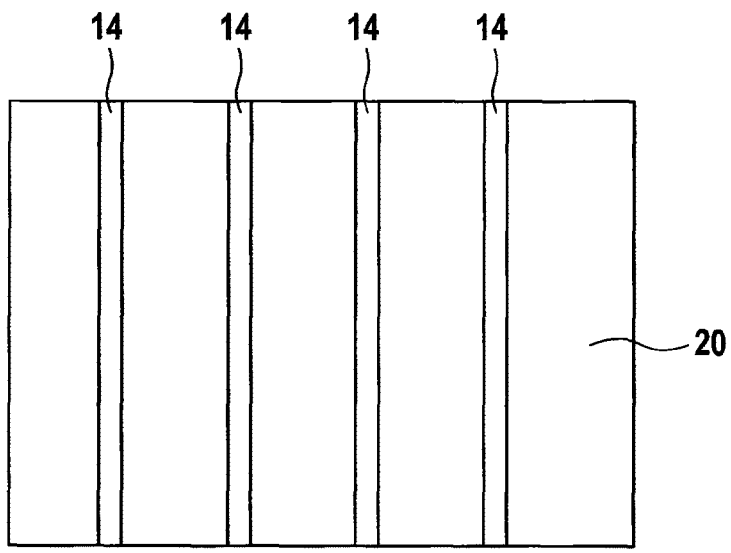
FIG. 4 shows the schematic view of an electron with interconnector material applied in strips, in a developed form.

FIG. 4 shows a development of a carrier film 20 which may already be fitted with an internal electrode (11, not illustrated) on the upper face. The interconnector material 14 is applied in a strip form, with the strips of the interconnector material 14 preferably extending in the longitudinal direction of the electrolyte body 10, and therefore in the longitudinal direction of the injection molding core 13. FIG. 4 shows a development in the form of a flattened-out illustration, in which the carrier film 20 can preferably form a flexible tube with a circular cross section. The strips of the interconnector material in consequence run at regular distances from one another in the longitudinal direction of the electrolyte body 10.

FIG. 5 shows a perspective view of a solid oxide fuel cell 1 which has an electrolyte body 10 which forms the basic structure of the fuel cell 1 and is closed at the top by a cap 24, in order to form the solid oxide fuel cell 1 as a fuel cell which is closed at one end. The solid oxide fuel cell 1 is mounted on a base body 17, at the same time showing contact elements 26 for making contact with the internal electrode 11, and a contact element 27 for making contact with the external electrode 12. Interconnector material 14 is furthermore shown both on the inside, having a web structure 19 which is formed in strips by the interconnector material 14, as is illustrated in FIG. 4. The external electrode 12 is likewise shown with a web structure. Because the solid oxide fuel cell 1 has a closed structure, it has an opening 28 for the fuel gas flow on the side of the base body 17.

Figure 6A:
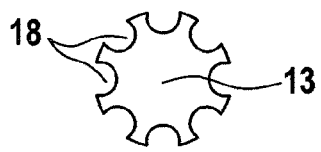
FIG. 6a shows one exemplary embodiment of an injection molding core provided with grooves.
Figure 6B:
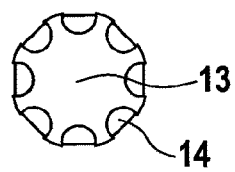
FIG. 6b shows the injection molding core as shown in FIG. 6a, with interconnector material having been introduced into the grooves in the injection molding core by means of a wiping process.
Figure 6C:
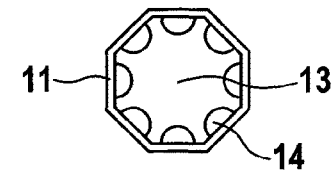
FIG. 6c shows the view as shown in FIG. 6b, with material for forming an internal electrode having been applied externally onto the injection molding core, and with the interconnector material having been introduced.

FIG. 6*a* shows one exemplary embodiment of an injection molding core 13 which is illustrated in the form of a cross section, and has grooves 18 distributed uniformly over the circumference. As can be seen from FIG. 6*b*, the grooves 18 can be filled with interconnector material 14, in which case, by way of example, the interconnector material 14 can be introduced into the grooves 18 by means of a wiping process. FIG. 6*c* shows that the internal electrode 11 has been applied after the application of the interconnector material 14, for example by a web-fed printing process or a screen printing process. FIG. 6*c* therefore shows an injection molding core 13 with the respective coating which, without the principle of film insert molding, and in consequence without a carrier film 20, allows electrolyte compound 10*a* to be injection molded into a mold, in which case the electrolyte compound 10*a* can form an integral connection to the internal electrode 11. During a subsequent burning process, both the ceramic electrolyte body 10 and the respective coatings 11 and 14 can be burnt in and hardened.

The embodiment of the invention is not restricted to the preferred exemplary embodiment indicated above. In fact, a number of variants are feasible which also make use of fundamentally different types of embodiment from the described solution. All features and/or advantages which result from the claims, the description or the drawings, including design details, physical arrangements and method steps, may be significant to the invention both in their own right and in widely differing combinations.

The invention claimed is:

1. A method for production of a solid oxide fuel cell (SOFC) (1), having an electrolyte body (10) with a tubular structure, wherein at least one internal electrode (11) and one external electrode (12) are applied to the tubular electrolyte body, the method comprising:
    providing an injection molding core (13) on which at least one interconnector material (14) and the internal electrode (11) are mounted;
    arranging the injection molding core (13) in an injection mold (25*a*, 25*b*);
    injection molding an electrolyte compound (10*a*) in order to form the electrolyte body (10); and
    removing the injection molding core (13) in the form of a lost core technique.

2. A method according to claim 1, characterized in that the injection molding core (13) is removed by means of a thermal process.

3. A method according to claim 1, characterized in that the injection molding core (13) is formed of a plastic material.

4. A method according to claim 1, characterized in that the injection molding core (13) is formed with a conical external contour, such that a first end (15) with a large diameter and a second end (16) with a small diameter of the injection molding core (13) are formed, wherein the second end (16) with the small diameter forms the holding end of the tubular electrolyte body (10) on a base body (17).

5. A method according to claim 1, characterized in that the interconnector material (14) and/or the internal electrode (11) are/is applied to the injection molding core (13) by means of a printing process.

6. A method according to claim 1, characterized in that the interconnector material (14) and/or the internal electrode (11) are/is applied to a carrier film (20), which is arranged on the injection molding core (13) before the injection molding of the electrolyte compound (10*a*), such that the electrolyte compound (10*a*) is connected to the internal electrode (11) on the carrier film (20) when the electrolyte compound (10*a*) is injection molded.

7. A method according to claim 6, characterized in that the interconnector material (14) is applied to the carrier film (20) in layers (21), and the internal electrode (11) is then applied.

8. A method according to claim 7, wherein the layers (21) of the interconnector material (14) extend to a different width over the length of the injection molding core (13) in the longitudinal direction, and form free areas (22).

9. A method according to claim 8, characterized in that the free areas (22) are filled with filling layers (23).

10. A method according to claim 1, characterized in that the injection molding core (13) has grooves (18) into which the interconnector material (14) is introduced, in order to form an interconnector layer (14) which has a structure.

11. A method according to claim 1, characterized in that the interconnector material (14) is applied with a small thickness in the area of the first end (15) and with a large thickness in the area of the second end (15), such that the interconnector material (14) has a conical internal shape.

12. A method according to claim 1, characterized in that, after the electrolyte body (10) together with the internal electrode (11) and the interconnector material (14) have been removed from the mold, the external electrode (12) is fitted to the tubular electrolyte body.

13. A method according to claim 1, characterized in that the injection molding core (13) is formed of a plastic material, wherein the thermal process for removal of the injection molding core (13) is carried out by burning out the plastic material.

14. A method according to claim 1, characterized in that the interconnector material (14) and/or the internal electrode (11) are/is applied to the injection molding core (13) by means of a web-fed printing process or a screen printing process.

15. A method according to claim 1, characterized in that the injection molding core (13) has grooves (18) into which the interconnector material (14) is introduced, in order to form an interconnector layer (14) which has a web structure (19) or a grid structure.

16. A method according to claim 1, characterized in that the interconnector material (14) is applied with a small thickness in the area of the first end (15) and with a large thickness in the area of the second end (15), such that the interconnector material (14) has a conical internal shape, and compensates for the conical shape of the injection molding core (13), such that the interconnector material (14) has an approximately cylindrical external shape.

17. A method according to claim 1, characterized in that, after the electrolyte body (10) together with the internal electrode (11) and the interconnector material (14) have been removed from the mold, the external electrode (12) is fitted and is subsequently burnt in.

18. A method according to claim 8, characterized in that the free areas (22) are filled with glassy carbon layers (23).

* * * * *